US007634692B2

(12) United States Patent
Liu et al.

(10) Patent No.: US 7,634,692 B2
(45) Date of Patent: Dec. 15, 2009

(54) SATA PRIMITIVE PREDICTION AND CORRECTION

(75) Inventors: Chuan Liu, Hsin-Chu (TW); Pao-Ching Tseng, Hsinchu County (TW)

(73) Assignee: MediaTek Inc., Hsin-Chu Hsien (TW)

( * ) Notice: Subject to any disclaimer, the term of this patent is extended or adjusted under 35 U.S.C. 154(b) by 727 days.

(21) Appl. No.: 11/456,077

(22) Filed: Jul. 6, 2006

(65) Prior Publication Data

US 2007/0189619 A1 Aug. 16, 2007

Related U.S. Application Data

(60) Provisional application No. 60/766,771, filed on Feb. 10, 2006.

(51) Int. Cl.
*G06F 11/00* (2006.01)

(52) U.S. Cl. ........................................ 714/49; 714/746

(58) Field of Classification Search .................. 714/49, 714/746, 747

See application file for complete search history.

(56) References Cited

U.S. PATENT DOCUMENTS 6,147,963 A * 11/2000 Walker et al. ............... 370/200
6,763,477 B1 * 7/2004 McGee ....................... 713/600
7,257,163 B2 * 8/2007 Hwang et al. ............... 375/242
7,313,751 B2 * 12/2007 Kang et al. ................. 714/799
7,339,500 B2 * 3/2008 Noda .......................... 341/50
7,406,652 B2 * 7/2008 Tseng et al. ................ 714/798
2004/0252716 A1 12/2004 Nemazie
2005/0240855 A1 10/2005 Tseng
2005/0268199 A1 12/2005 Tseng

* cited by examiner

*Primary Examiner*—Stephen M Baker
(74) *Attorney, Agent, or Firm*—Winston Hsu

(57) ABSTRACT

A method of correcting corrupted primitives transmitted between a serial advanced technology attachment (SATA) host and a SATA device includes detecting the presence of a corrupted primitive; analyzing a current state, a previously transmitted primitive, or a previously received primitive; selecting at least one candidate primitive according to at least one of the current state, the previously transmitted primitive, and the previously received primitive; predicting the identity of the corrupted primitive according to at least one candidate primitive and the corrupted primitive; and replacing the corrupted primitive with the predicted primitive.

41 Claims, 6 Drawing Sheets

320
Control logic
324
Primitive out
Current state
Input
Primitive decode
Primitive out
322
Primitive code book
326

| Primitive name | 4th byte contents | 3rd byte contents | 2nd byte contents | 1st byte contents |
|---|---|---|---|---|
| ALIGN | D27.3 | D10.2 | D10.2 | K28.5 |
| CONT | D25.4 | D25.4 | D10.5 | K28.3 |
| DMAT | D22.1 | D22.1 | D21.5 | K28.3 |
| EOF | D21.6 | D21.6 | D21.5 | K28.3 |
| HOLD | D21.6 | D21.6 | D10.5 | K28.3 |
| HOLDA | D21.4 | D21.4 | D10.5 | K28.3 |
| PMACK | D21.4 | D21.4 | D21.4 | K28.3 |
| PMNAK | D21.7 | D21.7 | D21.4 | K28.3 |
| PMREQ_P | D23.0 | D23.0 | D21.5 | K28.3 |
| PMREQ_S | D21.3 | D21.3 | D21.4 | K28.3 |
| R_ERR | D22.2 | D22.2 | D21.5 | K28.3 |
| R_IP | D21.2 | D21.2 | D21.5 | K28.3 |
| R_OK | D21.1 | D21.1 | D21.5 | K28.3 |
| R_RDY | D10.2 | D10.2 | D21.4 | K28.3 |
| SOF | D23.1 | D23.1 | D21.5 | K28.3 |
| SYNC | D21.5 | D21.5 | D21.4 | K28.3 |
| WTRM | D24.2 | D24.2 | D21.5 | K28.3 |
| X_RDY | D23.2 | D23.2 | D21.5 | K28.3 |

SATA PRIMITIVE PREDICTION AND CORRECTION

CROSS REFERENCE TO RELATED APPLICATIONS

This application claims the benefit of the filing date of U.S. provisional patent application No. 60/766,771, filed Feb. 10, 2006, the contents of which are hereby incorporated by reference.

BACKGROUND

The invention relates to serial advanced technology attachment (SATA) devices, and more particularly, to a method of correcting primitives that have become corrupted due to noise.

In the SATA protocol, the host and the device exchange information through Frame Information Structures (FIS). Each FIS is composed of a group of Dwords, and the Dwords convey information between the host and the device. The SATA host and SATA device utilize primitives for control purposes and to provide a status of the serial line. Each primitive is also made up of one Dword. Primitives are also used to perform handshaking between a host and a device.

Please refer to FIG. 1 . FIG. 1 is a table 10 illustrating byte contents of primitives used in the SATA protocol. Each primitive contains four bytes, and the contents of the first, second, third, and fourth bytes are shown in columns 12, 14, 16, and 18, respectively.

Please refer to FIG. 2. FIG. 2 is a diagram showing an example of sending a frame between a host and a device. The host can either be a transmitter 100 or a receiver 200, with the receiver being the other. In FIG. 2, the transmitter 100 transmits a series of data or primitives 102-188 to the receiver 200, and the receiver 200 responds with primitives 202-288 to be sent to the transmitter 100.

In FIG. 2, the transmitter 100 starts off by transmitting sync primitives followed by scrambled data packets 102, 104 to the receiver 200. The symbol "XXXX" represents the scrambled data values, and these data packets 102, 104 are not primitives. The scrambled data is used to reduce the effects of electromagnetic interference (EMI). When the transmitter 100 is ready to begin transmitting a frame to the receiver 200, the transmitter 100 outputs a transmission data ready (X_RDY) primitive indicating that the transmitter 100 is ready to transmit payload to the receiver 200. In this example, the transmitter 100 sends two X_RDY primitives 106, 108, issues a continue repeating previous primitive (CONT) primitive 110 to avoid having to output the same primitive repeatedly, and then outputs a series of scrambled data packets 112-118. The transmitter 100 continues this until the receiver 200 responds to the X_RDY primitives with a receiver ready (R_RDY) primitive, indicating that the receiver 200 is ready to receive the payload. In this example, the receiver 200 sends two R_RDY primitives 214, 216, issues a CONT primitive 218, and then outputs a series of scrambled data packets 220-224 until the transmitter 100 starts transmitting the frame.

The transmitter 100 sends a start of frame (SOF) primitive 120 to the receiver 200 to indicate that the frame is starting to be transmitted. Next, the transmitter 100 sends a type indicator 122 to specify the type of FIS that is being sent to the receiver 200, followed by a plurality of data packets 124-130. While the receiver 200 is receiving data from the transmitter 100, the receiver 200 outputs reception in progress (R_IP) primitives 226, 228 to the transmitter 100 followed by a CONT primitive 230 and scrambled data 232-238. When the transmitter 100 temporarily does not have any payload data ready for transmission, a hold data transmission (HOLD) primitive is output. As shown in FIG. 2, the transmitter 100 outputs HOLD primitives 132, 134 followed by a CONT primitive 136, scrambled data 138-142, and followed by another HOLD primitive 144. The receiver 200 acknowledges these HOLD primitives with hold acknowledge (HOLDA) primitives 240, 242 followed by a CONT primitive 244 and scrambled data 246-252.

The transmitter 100 then finishes sending the payload data with data packets 146-150, followed by cyclic redundancy check (CRC) data 152 and an end of frame (EOF) primitive 154. Next, the transmitter 100 continuously outputs wait for frame termination (WTRM) primitives 156-158, a CONT primitive 162, and scrambled data 164-170 while waiting for an indication of reception status from the receiver 200. The receiver 200, meanwhile, finishes receiving the payload data from the transmitter 100 and outputs R_IP primitives 254, 256 followed by a CONT primitive 258 and scrambled data 260, 262. After the receiver 200 has received all payload data, the CRC 152, the EOF 154, and verified that the CRC check has no problems, the receiver 200 then outputs reception with no error (R_OK) primitives 264, 266 followed by a CONT primitive 268 and scrambled data 270-278. If the CRC check did have problems, then the receiver 200 would instead output a reception error (R_ERR) primitive. Once the transmitter 100 has received the R_OK primitive from the receiver 200, the transmitter 100 then outputs synchronizing primitives (SYNC) 172, 174, followed by a CONT primitive 176 and scrambled data 178-188. The SYNC primitives are output when the transmitter 100 is idle, and also serve the purpose of synchronizing the transmitter 100 and the receiver 200. The receiver 200 will respond with SYNC primitives 280, 282, a CONT primitive 284, and scrambled data 286, 288 of its own.

The above scenario is illustrative of sending a frame of payload data without any transmission problems. However, noise can interfere with the transmission of primitives and data, which can cause communication problems between the transmitter 100 and the receiver 200. For instance, if the receiver 200 is not able to decode a SOF primitive sent from the transmitter 100, the receiver 200 will continue to send out a R_RDY primitive forever. However, the transmitter 100 will not know that the receiver 200 did not receive the SOF primitive, and will still send out data to the receiver 200 until the data transfer is complete, finishing by sending a WTRM primitive to the receiver 200. The receiver 200 will respond to the WTRM primitive with a SYNC primitive because it never received the SOF primitive at the beginning of the data transmission. Communication between the transmitter 100 and the receiver 200 may then hang at this point because the receiver 200 does not send either an R_OK or R_ERR primitive to the transmitter 100.

Another potential problem will result if HOLD, HOLDA, CONT, or EOF primitives are corrupted by noise. If these primitives are corrupted by noise, it may result in the wrong data transfer length. If the CRC check or 8-bit to 10-bit (8b10b) decoding are not able to identify this problem, then the problem may result in a system hang.

Additionally, if the HOLD, HOLDA, or CONT primitives are corrupted by noise, the transmitter 100 may send out too much data and overflow the first-in first-out receiving queue of the receiver 200. Because noise cannot always be eliminated entirely, there must be a way of overcoming the problems of corrupted primitives caused by noise.

SUMMARY

Methods for correcting corrupted primitives are provided. An exemplary embodiment of a method of correcting corrupted primitives transmitted between a serial advanced technology attachment (SATA) host and a SATA device includes detecting the presence of a corrupted primitive; analyzing a current state, a previously transmitted primitive, or a previously received primitive; selecting at least one candidate primitive according to at least one of the current state, the previously transmitted primitive, and the previously received primitive; predicting the identity of the corrupted primitive; and replacing the corrupted primitive with the predicted primitive.

Another exemplary embodiment of a method of correcting corrupted primitives transmitted between a SATA host and a SATA device includes detecting the presence of a corrupted primitive; comparing byte content and byte positions of the corrupted primitive with byte content and byte positions of possible primitives; predicting the identity of the corrupted primitive according to the comparison of the byte content and the byte positions; and replacing the corrupted primitive with the predicted primitive.

Another exemplary embodiment of a method of correcting corrupted primitives transmitted between a SATA host and a SATA device includes detecting the presence of a corrupted primitive; comparing portions of the corrupted primitive with portions of possible primitives; predicting the identity of the corrupted primitive according to the comparison of the portion payload; and replacing the corrupted primitive with the predicted primitive.

Another exemplary embodiment of a method of correcting corrupted primitives transmitted between a SATA host and a SATA device includes detecting the presence of a corrupted primitive; analyzing three consecutively received primitives; predicting the identity of the corrupted primitive according to the three consecutively received primitives; and replacing the corrupted primitive with the predicted primitive.

Another exemplary embodiment of a method of detecting incorrect primitives transmitted between a SATA host and a SATA device includes receiving a first primitive; receiving a second primitive immediately following reception of the first primitive; and detecting that the second primitive is an incorrect primitive when the second primitive cannot follow the first primitive during normal operation of the SATA host and SATA device.

DETAILED DESCRIPTION

Since primitives sent between the transmitter 100 and the receiver 200 can become corrupted by noise, it is useful to have a way of predicting what the original primitive was and then correcting the corrupted primitive to become the predicted primitive. Several exemplary embodiment methods are introduced for predicting the actual value of the corrupted primitive, and these embodiments can also be used in conjunction with each other for ensuring higher accuracy of the predictions. Each of the exemplary embodiment methods will be explained below with reference to FIG. 1 and FIG. 2.

First of all, some primitives are only used during certain transmission states. For example, after the receiver 200 has sent an R_RDY primitive to the transmitter 100, the receiver 200 will expect to receive an SOF primitive to begin frame transmission. Therefore, the receiver 200 can be restricted to predicting that a corrupted primitive is the SOF primitive only when sending out the R_RDY primitive. Moreover, the HOLD, HOLDA, CONT, and EOF primitives will only be corrected during a data transmission or data reception state. For example, the EOF primitive will only be expected when the receiver 200 is in a R_IP state, a direct memory access terminate (DMAT) state, or a HOLDA state, or a HOLD state. In these states, the EOF primitive can be predicted if it is determined to be the most likely value of the corrupted primitive. Similarly, the HOLD, HOLDA, and CONT primitives will only be expected when the receiver 200 is in a R_IP state, a direct memory access terminate (DMAT) state, a HOLDA state, a HOLD state, or when the transmitter 100 is in a HOLD state, HOLDA state or a data transmission state.

In addition to considering the current state of data transmission and reception, previously received primitives or later received primitives can also be used for predicting the value of corrupted primitives. Three, four, or five consecutive primitives can also be analyzed for determining the identity of corrupted primitives, wherein the corrupted primitive can be any one of the consecutive primitives being analyzed.

Figure 2:
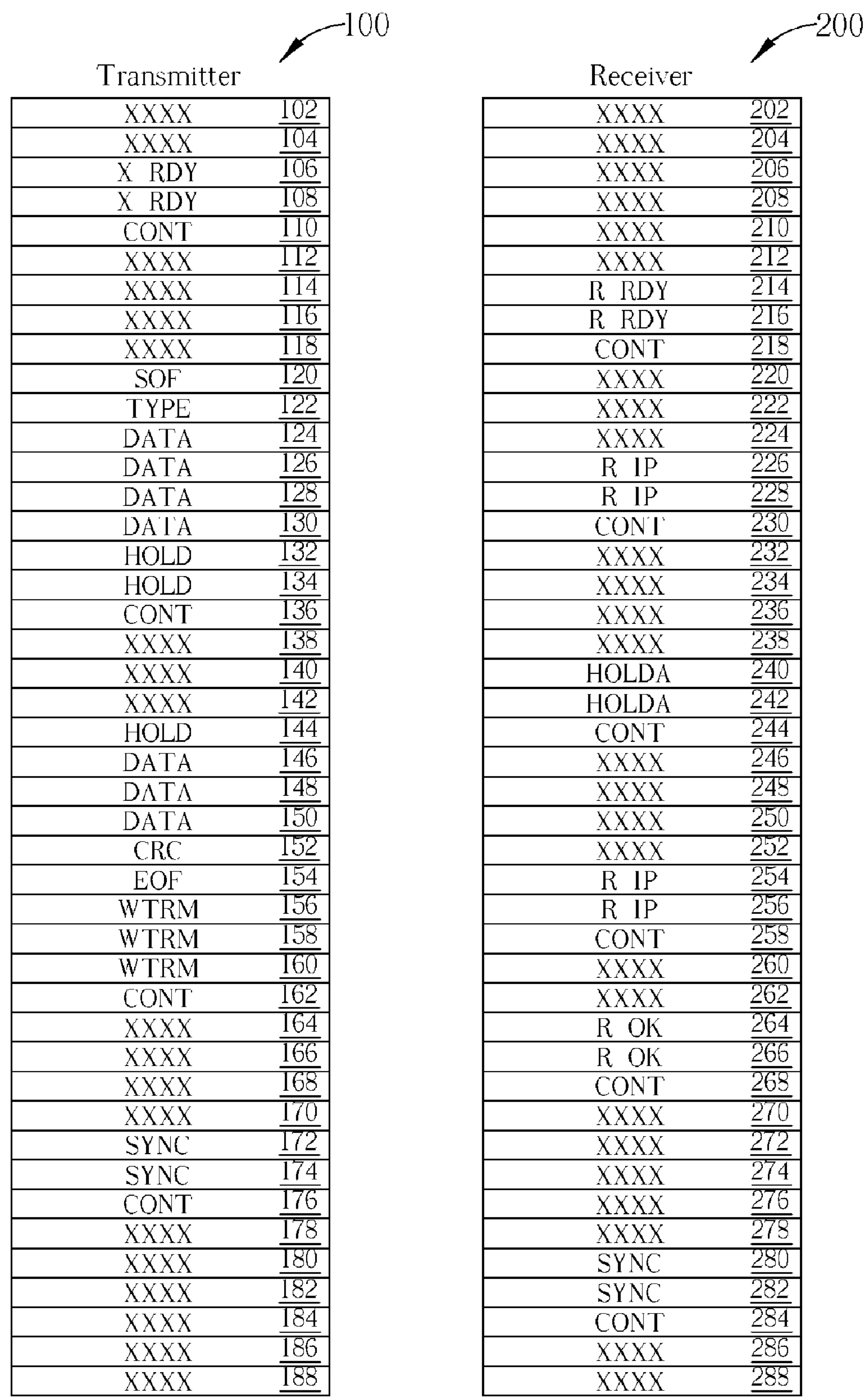
FIG. 2 is a diagram showing an example of sending a frame between a host and a device.

The CONT primitive especially benefits from these predictions due to the conditions under which it is used. As shown in FIG. 2, the CONT primitive always follows two identical primitives, and is often followed by scrambled data. The CONT primitive is used instead of having the same primitive repeatedly transmitted, which could cause problems with EMI. Because of the special pattern in which the CONT primitive always follows two identical primitives, it is easier to make predictions. That is, if a corrupted primitive follows two identical primitives, it is possible that the corrupted primitive is the CONT primitive. On the other hand, if a CONT primitive follows a pair of primitives, where one of the primitives is corrupted and the other is non-corrupted, the corrupted primitive can reliably be predicted to be identical to the non-corrupted primitive.

Figure 1:
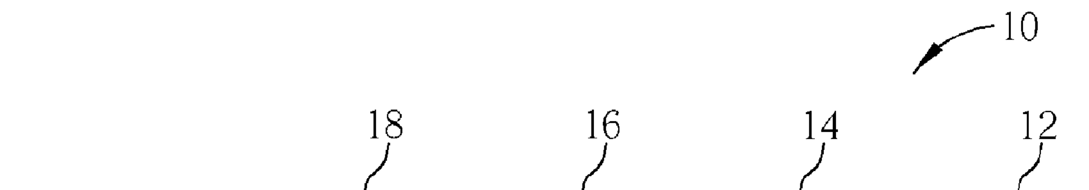
FIG. 1 is a table illustrating byte contents of primitives used in the SATA protocol.

As shown in FIG. 1, the contents of one or more bytes of corrupted primitives can also be used to predict the actual identity of the corrupted primitives. For example, when a third or a fourth byte of the corrupted primitive has a content of D23.1, the identity of the corrupted primitive is predicted to be a SOF primitive. Further checking can also be performed to ensure greater accuracy. That is, the content of other bytes such as the second, third, and fourth bytes of the corrupted primitive can also be checked to make sure that these bytes do not match the corresponding content of other possible primitives. In addition, fractions of the 32 or 40 bits of each corrupted primitive can also be compared to the known bit values of primitives to predict the identity of the corrupted primitive. A predetermined number of bits of the corrupted primitive can be compared with the predetermined number of bits of the possible primitives. For example, if the 23 least significant bits of the 40 bits of the corrupted primitive are consistent with the 23 least significant bits of the CONT primitive, then the corrupted primitive is predicted to be the CONT primitive.

The EOF primitive can also be similarly predicted. When a first byte of the corrupted primitive has a content of K28.3, a second byte of the corrupted primitive has a content of D21.5, and either a third byte or a fourth byte has a content of D21.6, the identity of the corrupted primitive is predicted to be an EOF primitive. Further checks can also be made to confirm that the content of both the third and fourth bytes of the corrupted primitive do not match the corresponding content of other possible primitives.

When a first byte of the corrupted primitive has a content of K28.3, a second byte of the corrupted primitive has a content of D10.5 and either a third byte or a fourth byte has a content of D25.4, the identity of the corrupted primitive can be predicted to be a CONT primitive. Further checks can be made to confirm that the content of the second, third, and fourth bytes of the corrupted primitive do not match the corresponding content of other possible primitives.

When a first byte of the corrupted primitive has a content of K28.3, a second byte has a content of D10.5, and either a third byte or a fourth byte has a content of D21.6, the identity of the corrupted primitive is predicted to be a HOLD primitive. Further checks can also be made to confirm that the content of the third and fourth bytes of the corrupted primitive do not match the corresponding content of other possible primitives.

When a first byte of the corrupted primitive has a content of K28.3, a second byte has a content of D10.5, and either a third byte or a fourth byte has a content of D21.4, the identity of the corrupted primitive is predicted to be a HOLDA primitive. Further checks can also be made to confirm that the content of the third and fourth bytes of the corrupted primitive do not match the corresponding content of other possible primitives.

Figure 3:
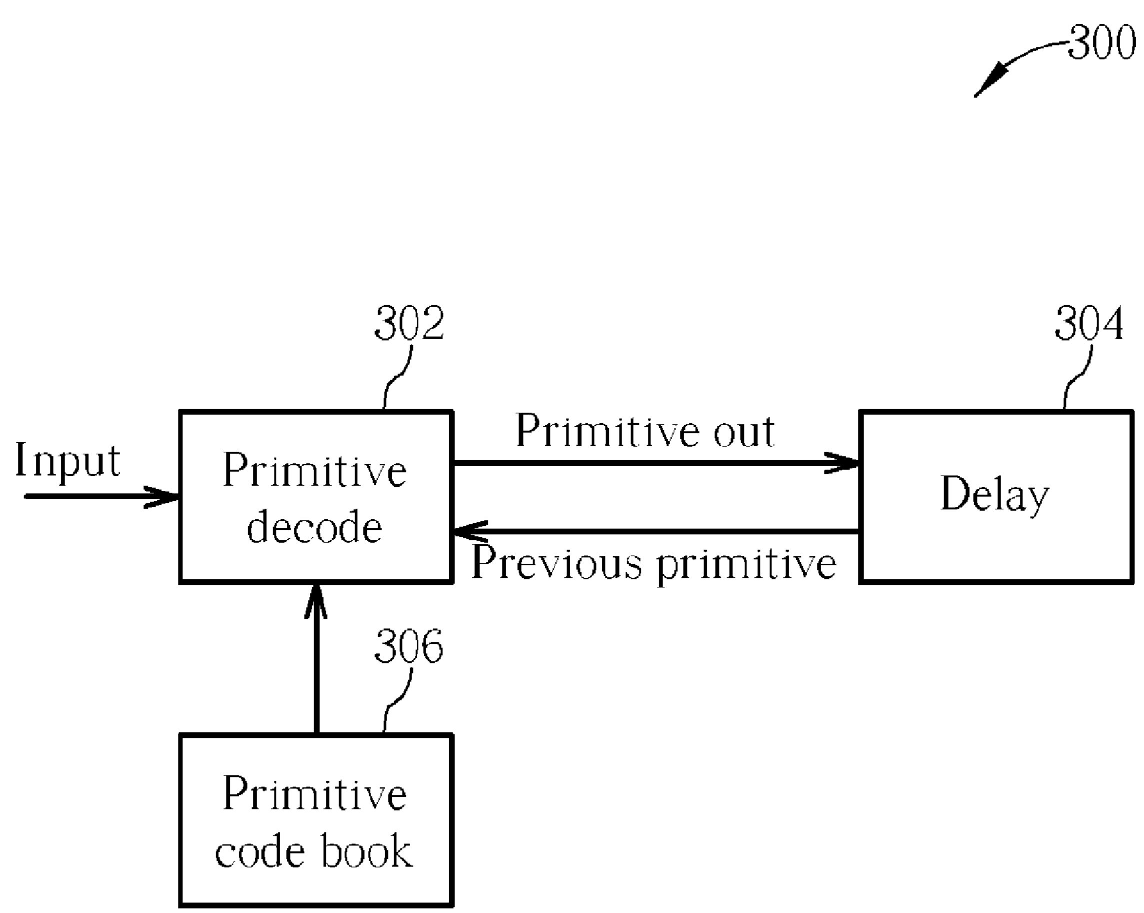
FIG. 3 is a functional block diagram of an exemplary embodiment primitive prediction system.

Please refer to FIG. 3. FIG. 3 is a functional block diagram of an exemplary embodiment primitive prediction system 300. The system 300 includes a primitive decode circuit 302 which receives a series of primitives as input. As each primitive is received by the primitive decode circuit 302, it predicts the value of the primitive if the primitive is corrupted and passes the primitive on to a delay circuit 304. The delay circuit 304 adds a delay of one primitive period, and outputs the previously received primitive to the primitive decode circuit 302 as the primitive decode circuit 302 is receiving the following primitive. Furthermore, the primitive decode circuit 302 reads information from a primitive code book 306 for determining the actual bit and byte values that the primitives should have. The primitive decode circuit 302 uses information including one or more previously received primitives, the currently received primitive, and the values of standard primitives according to the primitive code book 306 to predict the value of the corrupted primitive.

Figure 4:
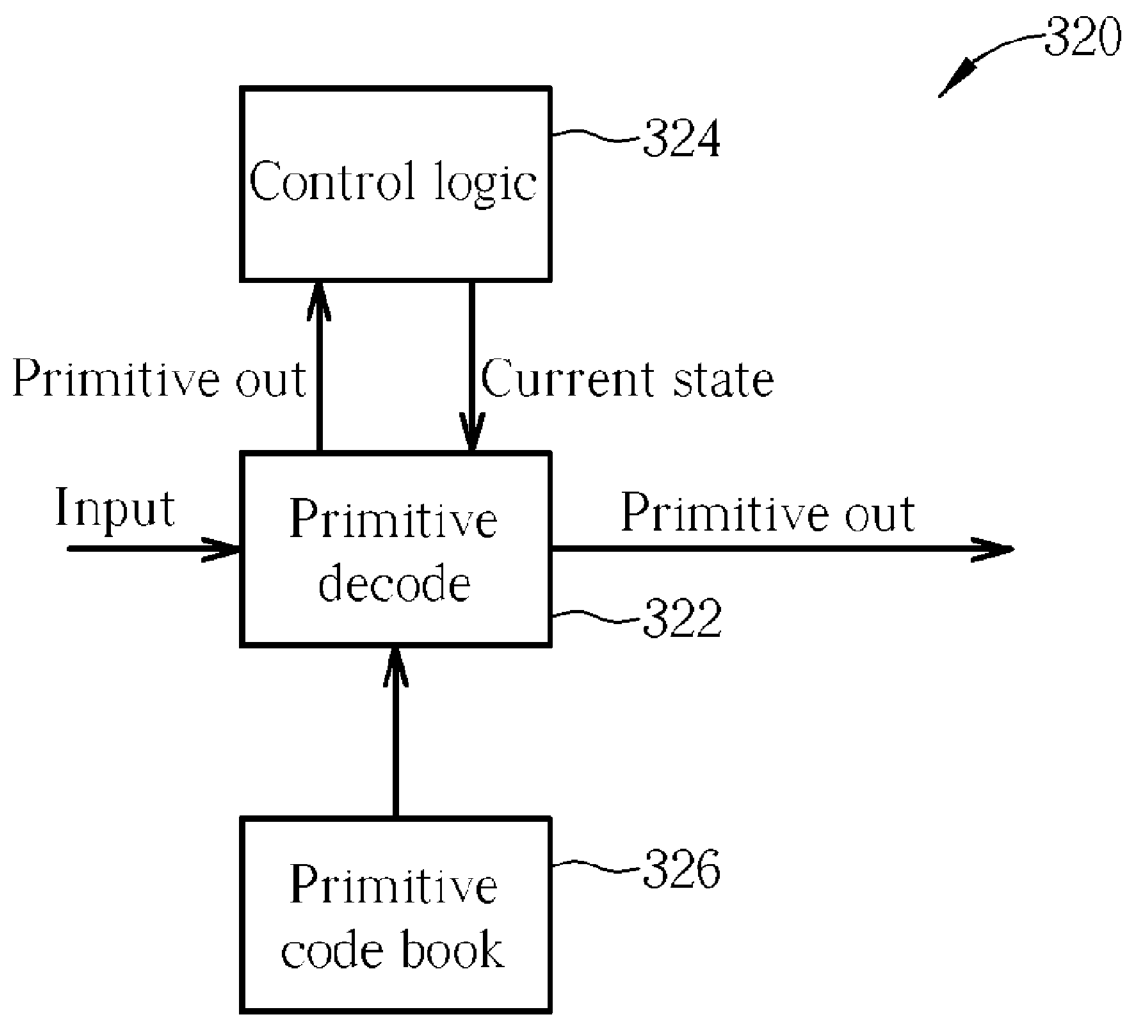
FIG. 4 is a functional block diagram of another exemplary embodiment primitive prediction system.

Please refer to FIG. 4. FIG. 4 is a functional block diagram of another exemplary embodiment primitive prediction system 320. The system 320 includes a primitive decode circuit 322, a primitive code book 326, and control logic 324. The primitive decode circuit 322 receives a series of primitives as input, predicts the values of the primitives and outputs the predicted primitives. A copy of the predicted primitives is also passed to the control logic 324, which keeps track of the current state of transmission and reception. The control logic 324 will output the current state to the primitive decode circuit 322, which uses this information together with information from the primitive code book 326 to predict the values of corrupted primitives.

Figure 5:
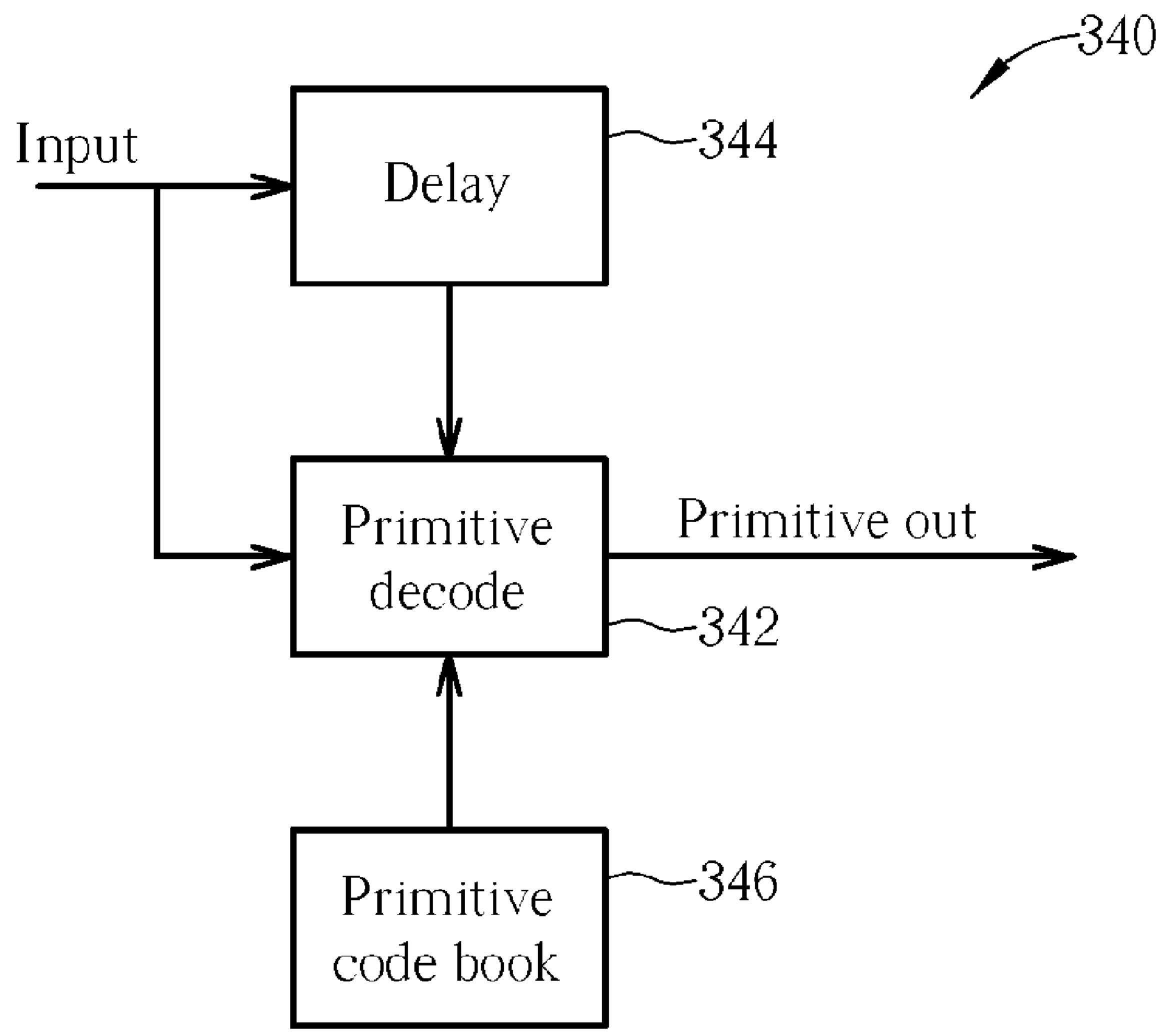
FIG. 5 is a functional block diagram of another exemplary embodiment primitive prediction system.

Please refer to FIG. 5. FIG. 5 is a functional block diagram of another exemplary embodiment primitive prediction system 340. The system 340 is similar to the system 300 shown in FIG. 4, but has a slightly different arrangement of a delay circuit 344. Received primitives are input to both the delay circuit 344 and a primitive decode circuit 342. The primitive decode circuit 342 also receives previously received primitives from the delay circuit 344. The primitive decode circuit 342 uses the previously received primitive information together with the current primitive value and information from a primitive code book 346 to predict the values of corrupted primitives.

Figure 6:
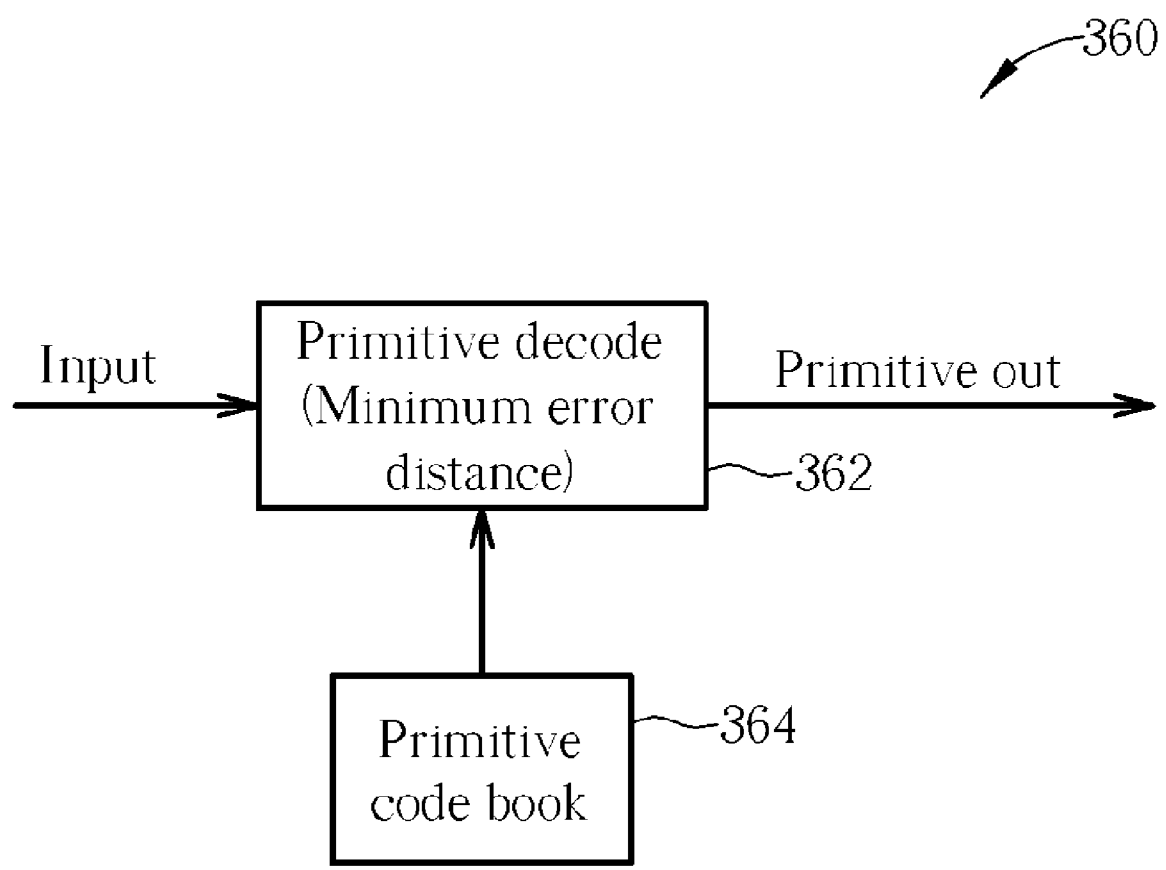
FIG. 6 is a functional block diagram of yet another exemplary embodiment primitive prediction system.

Please refer to FIG. 6. FIG. 6 is a functional block diagram of yet another exemplary embodiment primitive prediction system 360. The system 360 comprises a primitive decode circuit 362 and a primitive code book 364. The primitive decode circuit 362 receives a current primitive and compares the bits and bytes of the current primitives to standard primitive values contained in the primitive code book 364. The current primitive is then predicted to be whichever standard primitive the current primitive is closest to out of all of the candidate primitives. In order for the corrupted primitive to be closest in contents to a specific candidate primitive as compared to the other candidate primitives, the hamming distance between the corrupted primitive and the specific candidate primitive is smallest as compared to the other candidate primitives. The hamming distance is measured by performing an exclusive-OR (XOR) function on the candidate primitives and the corrupted primitives bit by bit.

It should be noted that the prediction of the identity of corrupted primitives is not limited to the SOF, HOLD, HOLDA, CONT, and EOF primitives. Other primitives can also be predicted and corrected in the same way that these five primitives are. However, the incorrect detection of these five primitives can have the effect of stalling or hanging communication and data transmission between the transmitter 100 and the receiver 200, so they are viewed as especially important. For best results, both state information and byte content comparisons are used to predict the identity of corrupted primitives. Once the identity of the corrupted primitive is determined, the corrupted primitive is then replaced with the predicted primitive for elimination communication problems between the transmitter 100 and the receiver 200. The above method is suitable for application to the serial advanced technology attachment (SATA) specification or Serial-Attached SCSI (SAS) specification, along with any other similar communication standards.

In addition to predicting the identity of corrupted primitives, incorrect primitives can also be detected by analyzing both the previously received primitive and the currently received primitive that immediately follows the previously received primitive. For example, if the previously received primitive is a reception with no error (R_OK) primitive and the currently received primitive is a reception error (R_ERR) primitive, it can be deduced that the currently received primitive is an incorrect primitive since the reception error (R_ERR) primitive cannot follow the reception with no error (R_OK) primitive. Likewise, if the previously received primitive is a transmission data ready (X_RDY) primitive and the currently received primitive is a wait for frame termination (WTRM) primitive, it can be deduced that the currently received primitive is an incorrect primitive since the wait for frame termination (WTRM) primitive cannot follow the transmission data ready (X_RDY) primitive. Therefore, even if the currently received primitive is a valid primitive and adheres to the protocol of the serial advanced technology attachment (SATA) specification, incorrect primitives can still be detected.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of correcting corrupted primitives transmitted between a serial advanced technology attachment (SATA) host and a SATA device, the method comprising:
- detecting the presence of a corrupted primitive;
- analyzing a current state, a previously transmitted primitive, or a previously received primitive;
- selecting at least one candidate primitive according to at least one of the current state, the previously transmitted primitive and the previously received primitive;
- predicting the identity of the corrupted primitive according to at least one candidate primitive and the corrupted primitive; and
- replacing the corrupted primitive with the predicted primitive.

2. The method of claim 1, wherein when fractions of the corrupted primitive have the same content as a specific candidate primitive X, the identity of the corrupted primitive is predicted to be primitive X.

3. The method of claim 1, wherein the primitive has 40 bits or 32 bits.

4. The method of claim 1, wherein when the current state is a receiver ready state, a third byte of the corrupted primitive has a content of D23.1 or a fourth byte of the corrupted primitive has a content of D23.1, and the previously transmitted primitive as a R_RDY primitive, the identity of the corrupted primitive is predicted to be a start of frame (SOF) primitive.

5. The method of claim 1, wherein when analyzing that the previously received primitive was a transmission data ready (X_RDY) primitive and a third byte of the corrupted primitive has a content of D23.1 or a fourth byte of the corrupted primitive has a content of D23.1, the identity of the corrupted primitive is predicted to be a start of frame (SOF) primitive.

6. The method of claim 1, wherein when the current state of data reception indicates a reception in progress (R_IP) state, direct memory access terminate (DMAT) state, hold data transmission (HOLD) state, or hold acknowledge (HOLDA) state, and a first byte of the corrupted primitive has a content of K28.3, a second byte of the corrupted primitive has a content of D21.5, and either a third byte or a fourth byte has a content of D21.6, the identity of the corrupted primitive is predicted to be an end of frame (EOF) primitive.

7. The method of claim 1, further comprising determining that the previously received payload was data, and a first byte of the corrupted primitive has a content of K28.3, a second byte of the corrupted primitive has a content of D21.5 to predict EOF.

8. The method of claim 1, wherein when the current state of data transmission or data reception indicates a reception in progress (R_IP) state, direct memory access terminate (DMAT) state, hold data transmission (HOLD) state, hold acknowledge (HOLDA) state, or data transmission state, and a first byte of the corrupted primitive has a content of K28.3 and either a third byte or a fourth byte has a content of D25.4, the identity of the corrupted primitive is predicted to be a continue repeating previous primitive (CONT) primitive.

9. The method of claim 1, wherein analyzing the current state of data reception further comprises determining that the two previously received primitives were identical primitives and a first byte of the corrupted primitive has a content of K28.3 and either a third byte or a fourth byte has a content of D25.4 to predict CONT.

10. The method of claim 1, further comprising determining that a first byte of the corrupted primitive has a content of K28.3 and either a third byte or a fourth byte has a content of D25.4 to predict CONT.

11. The method of claim 1, wherein when the current state of data transmission or data reception indicates a reception in progress (R_IP) state, direct memory access terminate (DMAT) state, hold data transmission (HOLD) state, hold acknowledge (HOLDA) state, or data transmission state, and a first byte of the corrupted primitive has a content of K28.3 a second byte has a content of D10.5, and either a third byte or a fourth byte has a content of D21.6, the identity of the corrupted primitive is predicted to be a HOLD primitive.

12. The method of claim 1, further comprising determining that the previously received primitive was a HOLD primitive, and a first byte of the corrupted primitive has a content of K28.3 and either a third byte or a fourth byte has a content of D21.6.

13. The method of claim 1, wherein when the current state of data transmission or data reception indicates a reception in progress (R_IP) state, direct memory access terminate (DMAT) state, hold data transmission (HOLD) state, hold acknowledge (HOLDA) state, or data transmission state, and a first byte of the corrupted primitive has a content of K28.3, a second byte has a content of D10.5, and either a third byte or a fourth byte has a content of D21.4, the identity of the corrupted primitive is predicted to be a HOLDA primitive.

14. The method of claim 1, further comprising determining that the previously received primitive was a HOLDA primitive, and a first byte has a content of K28.3, and either a third byte or a fourth byte has a content of D21.4.

15. The method of claim 1, wherein when the current state of data transmission or data reception indicates that a corrupted primitive is received in one of the two primitives preceding a continue repeating previous primitive (CONT) primitive, the corrupted primitive is predicted to be equal to the other of the two primitives that is not corrupted.

16. The method of claim 1, wherein when at least one byte of the corrupted primitive has the same content as a corresponding byte of a specific candidate primitive X, the identity of the corrupted primitive is predicted to be primitive X.

17. The method of claim 16, wherein the candidate primitives are selected from the group consisting of SOF, EOF, CONT, HOLD, and HOLDA.

18. The method of claim 16, wherein the candidate primitives are primitives used in the serial advanced technology attachment (SATA) specification or Serial-Attached SCSI (SAS) specification.

19. The method of claim 1, wherein when M bytes of N bytes of the corrupted primitive have the same content as corresponding bytes of a specific candidate primitive X, the identity of the corrupted primitive is predicted to be primitive X.

20. The method of claim 19, wherein M and N are integers and M is smaller than N.

21. The method of claim 19, wherein M is one of 1, 2, and 3 and N is 4.

22. The method of claim 1, wherein when the corrupted primitive is closest in contents to a specific candidate primitive X as compared to the other candidate primitives, the identity of the corrupted primitive is predicted to be primitive X.

23. The method of claim 22, wherein when the corrupted primitive is closest in contents to a specific candidate primitive X as compared to the other candidate primitives, the hamming distance between the corrupted primitive and the specific candidate primitive X is smallest as compared to the other candidate primitives.

24. The method of claim 23, wherein the hamming distance is measured by performing exclusive-OR function bit by bit.

25. A method of correcting corrupted primitives transmitted between a serial advanced technology attachment (SATA) host and a SATA device, the method comprising:

- detecting the presence of a corrupted primitive;
- comparing byte content and byte positions of the corrupted primitive with byte content and byte positions of possible primitives;
- predicting the identity of the corrupted primitive according to the comparison of the byte content and the byte positions; and
- replacing the corrupted primitive with the predicted primitive.

26. The method of claim 25, wherein the possible primitives are primitives used in the serial advanced technology attachment (SATA) specification or Serial-Attached SCSI (SAS) specification.

27. The method of claim 25, wherein the byte content is stored using 10 bits or 8 bits.

28. The method of claim 25, wherein when a first byte of the corrupted primitive has a content of K28.3, a third byte of the corrupted primitive has a content of D23.1 or a fourth byte of the corrupted primitive has a content of D23.1, and content of the second, third, and fourth bytes of the corrupted primitive does not match the corresponding content of other possible primitives, the identity of the corrupted primitive is predicted to be a start of frame (SOF) primitive.

29. The method of claim 25, wherein when a first byte of the corrupted primitive has a content of K28.3, a second byte of the corrupted primitive has a content of D21.5, and either a third byte or a fourth byte has a content of D21.6, and content of third and fourth bytes of the corrupted primitive does not match the corresponding content of other possible primitives, the identity of the corrupted primitive is predicted to be an end of frame (EOF) primitive.

30. The method of claim 25, wherein when a first byte of the corrupted primitive has a content of K28.3 and either a third byte or a fourth byte has a content of D25.4, and content of the second, third, and fourth bytes of the corrupted primitive does not match the corresponding content of other possible primitives, the identity of the corrupted primitive is predicted to be a continue repeating previous primitive (CONT) primitive.

31. The method of claim 25, wherein when a first byte of the corrupted primitive has a content of K28.3 and a second byte of the corrupted primitive has a content of D10.5, either a third byte or a fourth byte has a content of D25.4, the identity of the corrupted primitive is predicted to be a continue repeating previous primitive (CONT) primitive, wherein the content of the third, and fourth bytes of the corrupted primitive do not match the corresponding content of other possible primitives.

32. The method of claim 25, wherein when a first byte of the corrupted primitive has a content of K28.3, second byte has a content of D10.5, and either a third byte or a fourth byte has a content of D21.6, and content of the third and fourth bytes of the corrupted primitive does not match the corresponding content of other possible primitives, the identity of the corrupted primitive is predicted to be a hold data transmission (HOLD) primitive.

33. The method of claim 25, wherein when a first byte of the corrupted primitive has a content of K28.3, second byte has a content of D10.5 and either a third byte or a fourth byte has a content of D21.4, and content of the third and fourth bytes of the corrupted primitive does not match the corresponding content of other possible primitives, the identity of the corrupted primitive is predicted to be a hold acknowledge (HOLDA) primitive.

34. A method of correcting corrupted primitives transmitted between a serial advanced technology attachment (SATA) host and a SATA device, the method comprising:

- detecting the presence of a corrupted primitive;
- comparing portions of the corrupted primitive with portions of possible primitives;
- predicting the identity of the corrupted primitive according to the comparison of the portion payload; and
- replacing the corrupted primitive with the predicted primitive.

35. The method of claim 34, wherein the step of comparing is implemented by comparing a predetermined number of bits of the corrupted primitive with the predetermined number of bits of the possible primitives.

36. A method of correcting corrupted primitives transmitted between a serial advanced technology attachment (SATA) host and a SATA device, the method comprising:

- detecting the presence of a corrupted primitive;
- analyzing three consecutively received primitives;
- predicting the identity of the corrupted primitive according to the three consecutively received primitives; and
- replacing the corrupted primitive with the predicted primitive.

37. The method of claim 36, wherein the corrupted primitive is selected from a group of the three consecutively received primitives.

38. The method of claim 37, further comprising analyzing four or five consecutively received primitives.

39. A method of detecting incorrect primitives transmitted between a serial advanced technology attachment (SATA) host and a SATA device, the method comprising:

- receiving a first primitive;
- receiving a second primitive immediately following reception of the first primitive; and
- detecting that the second primitive is an incorrect primitive when the second primitive cannot follow the first primitive during normal operation of the SATA host and SATA device.

40. The method of claim 39, wherein the first primitive is a reception with no error (R_OK) primitive and the second primitive is a reception error (R_ERR) primitive.

41. The method of claim 39, wherein the first primitive is a transmission data ready (X_RDY) primitive and the second primitive is a wait for frame termination (WTRM) primitive.

* * * * *

UNITED STATES PATENT AND TRADEMARK OFFICE

CERTIFICATE OF CORRECTION

PATENT NO. : 7,634,692 B2
APPLICATION NO. : 11/456077
DATED : December 15, 2009
INVENTOR(S) : Liu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 831 days.

Signed and Sealed this

Twenty-first Day of December, 2010

David J. Kappos

*Director of the United States Patent and Trademark Office*